United States Patent
Wu et al.

(10) Patent No.: US 6,816,936 B1
(45) Date of Patent: Nov. 9, 2004

(54) HOT-SWAPPABLE ROUTER INTERFACE CARD WITH STABLE POWER ON/OFF PROCEDURE

(75) Inventors: Mike M. Wu, Fremont, CA (US); Ross Heitkamp, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 487 days.

(21) Appl. No.: 09/751,839

(22) Filed: Jan. 2, 2001

(51) Int. Cl.[7] .................................................. G06F 1/00
(52) U.S. Cl. ........................ 710/302; 710/301; 713/340; 713/330; 713/324
(58) Field of Search .................................. 710/300–304, 710/305–306, 311–315, 62–64, 15–17, 9–11; 713/324–340, 310

(56) References Cited

U.S. PATENT DOCUMENTS

| | | | | |
|---|---|---|---|---|
| 5,758,171 A | * | 5/1998 | Ramamurthy et al. ...... | 713/300 |
| 5,809,256 A | * | 9/1998 | Najemy ....................... | 710/303 |
| 6,062,480 A | * | 5/2000 | Evoy ........................... | 710/302 |
| 6,125,418 A | * | 9/2000 | Cox et al. ................... | 710/104 |
| 6,149,319 A | * | 11/2000 | Richter et al. .............. | 713/300 |
| 6,170,028 B1 | * | 1/2001 | Wallach et al. ............. | 710/302 |
| 6,327,635 B1 | * | 12/2001 | Alston et al. ............... | 710/301 |
| 6,418,492 B1 | * | 7/2002 | Papa et al. .................. | 710/302 |
| 6,434,652 B1 | * | 8/2002 | Bailis et al. ................ | 710/302 |
| 6,574,695 B1 | * | 6/2003 | Mott et al. .................. | 710/302 |

* cited by examiner

*Primary Examiner*—Paul R. Myers
*Assistant Examiner*—Raymond N Phan
(74) *Attorney, Agent, or Firm*—Harrity & Snyder LLP

(57) ABSTRACT

A network router includes hot-swappable physical interface cards that allow the router to communicate using a variety of network technologies. Power to the interface cards is sequentially ramped to avoid disruptive power surges. The router includes multiple power supplies, a power monitor circuit, power on/off control circuitry, and a controller. The controller detects the presence/absence of the physical interface cards and controls the power monitor circuit and power on/off control circuit to sequentially ramp or sequentially remove power to the physical interface cards.

29 Claims, 5 Drawing Sheets

HOT-SWAPPABLE ROUTER INTERFACE CARD WITH STABLE POWER ON/OFF PROCEDURE

BACKGROUND OF THE INVENTION

A. Field of the Invention

The present invention relates generally to configurable computing devices and, more particularly, to hot-swappable cards that can be inserted and removed from the computing device while the device continues to operate.

B. Description of Related Art

Certain computing devices include the ability for the end-user to add and remove hardware components to/from the computing device. For example, a graphics or sound card may be added to a personal computer to increase the performance of the computer. A basic implementation of such a dynamic card insertion requires that the user turn off the computing device before inserting the new card. The computing device then detects, the next time it is turned on, the new hardware card. In this manner, the functionality of the core computing device can be extended by adding an appropriate hardware card.

Some add-on hardware components are "hot-swappable" (also called "live insertion/removal") meaning that the user does not have to reset the computing device when inserting or removing the hardware component. Instead, the user simply inserts or removes the hardware component while the computing device is operating, and the computing device dynamically recognizes and begins to communicate with the new hardware component. In this manner, the new component can be inserted and removed from the computing device without interruption of the device.

Hot-swappable add-on components are particularly desirable in critical computing devices that should not be taken off-line. For example, high performance network routers may route traffic through a network for many thousands of users. A router is a device that controls the flow of data packets in a network. It is desirable that these routers operate continuously and without interruption. Accordingly, when inserting add-on components to a high-performance router, it is desirable that the add-on components be hot-swappable.

There are a number of problems that may occur when designing a hot-swappable system for sensitive, high-performance systems. One problem is power disruptions. Inserting a hardware component, such as a circuit board, into an operational system can cause power disruptions due to the sudden increase in load presented to the power supply and the finite response time of that power supply. This is especially true when high capacitance values are used on the circuit board being inserted. This results in an in-rush current which can starve neighboring circuits, potentially causing the logic on these circuits to reset or experience errors.

In addition to power disruptions, software disruptions can occur when inserting and removing a circuit board. In particular, upon removal of a circuit board, the software controlling the system may try to access the board and fail to get a response, thus causing a fatal error. A variation on this problem can occur on insertion if the software tries to access the circuit board before it is fully inserted and stable in the system.

Thus, there is a need in the art to be able to reliably implement hot-swappable components in a high-performance computing device such as a router.

SUMMARY OF THE INVENTION

Systems and methods consistent with the present invention address this and other need to effectively implement hot-swappable interface cards in a router.

In accordance with the purpose of the invention as embodied and broadly described herein, a first aspect of the present invention is directed to a network device including slots for hot-swappable physical interface cards. The network device includes an interface designed to receive the physical interface cards, a plurality of power supply lines, and an on/off power control circuit connected to the plurality of power supply lines. Finally, a controller is connected to the on/off power control circuit. The controller, in response to detecting the presence of the physical interface card in the interface, instructs the on/off power control circuit to turn on the power supply lines by ramping the power supplied to each one of the sequentially turned on power supply lines.

A second aspect of the present invention is directed to a hot-swappable physical interface card designed to be inserted into a network device. An interface in the physical interface card connects the physical interface card to the network device and includes a number of connections. These connections include power supply lines through which power is received from the network device, a high-speed data bus for transmitting and receiving packets of information from the network device, and a control bus. The network device sequentially activates the power supply lines and ramps the power supplied to each one of the sequentially activated power supply lines in response to the network device detecting insertion of the physical interface card.

Additional aspects of the present invention are directed to methods for inserting and removing interface cards from the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a network router includes hot-swappable physical interface cards that allow the router to communicate using a variety of network technologies. The presence/absence of the interface cards may be detected through both hardware and software. Power to the interface cards may be ramped to avoid disruptive power surges.

Figure 1:
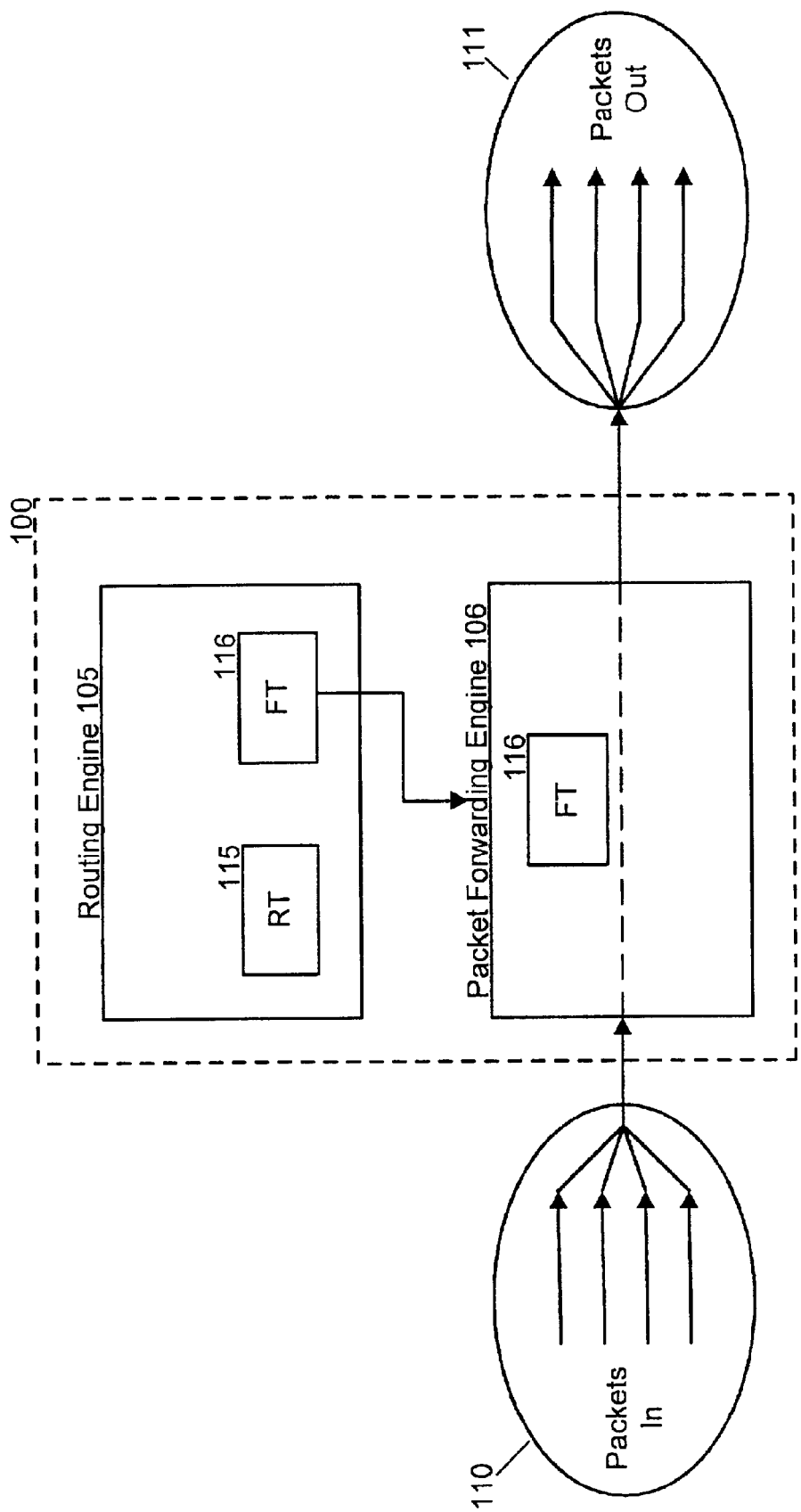
FIG. 1 is a diagram illustrating functional components of an exemplary network router.

FIG. 1 is a diagram illustrating, at a high-level, functional components of an exemplary router 100. In general, router 100 receives incoming packets 110, determines the next destination (the next "hop" in the network) for the packets, and outputs the packets as outbound packets 111 on physical links that lead to the next destination. In this manner, packets "hop" from router to router in a network until reaching their final destination.

Router 100 includes routing engine 105 and a packet forwarding engine (PFE) 106. Routing engine 105 may maintain one or more routing tables (RTs) 115 and a forwarding table (FT) 116. Through routing tables 115, routing engine 105 consolidates routing information that the routing engine 105 learns from the routing protocols of the network. From this routing information, the routing protocol process may determine the active routes to network destinations and store these routes in forwarding table 116. Packet forwarding engine 106 may consult forwarding table 116 when determining the next destination for incoming packets 110.

Figure 2:
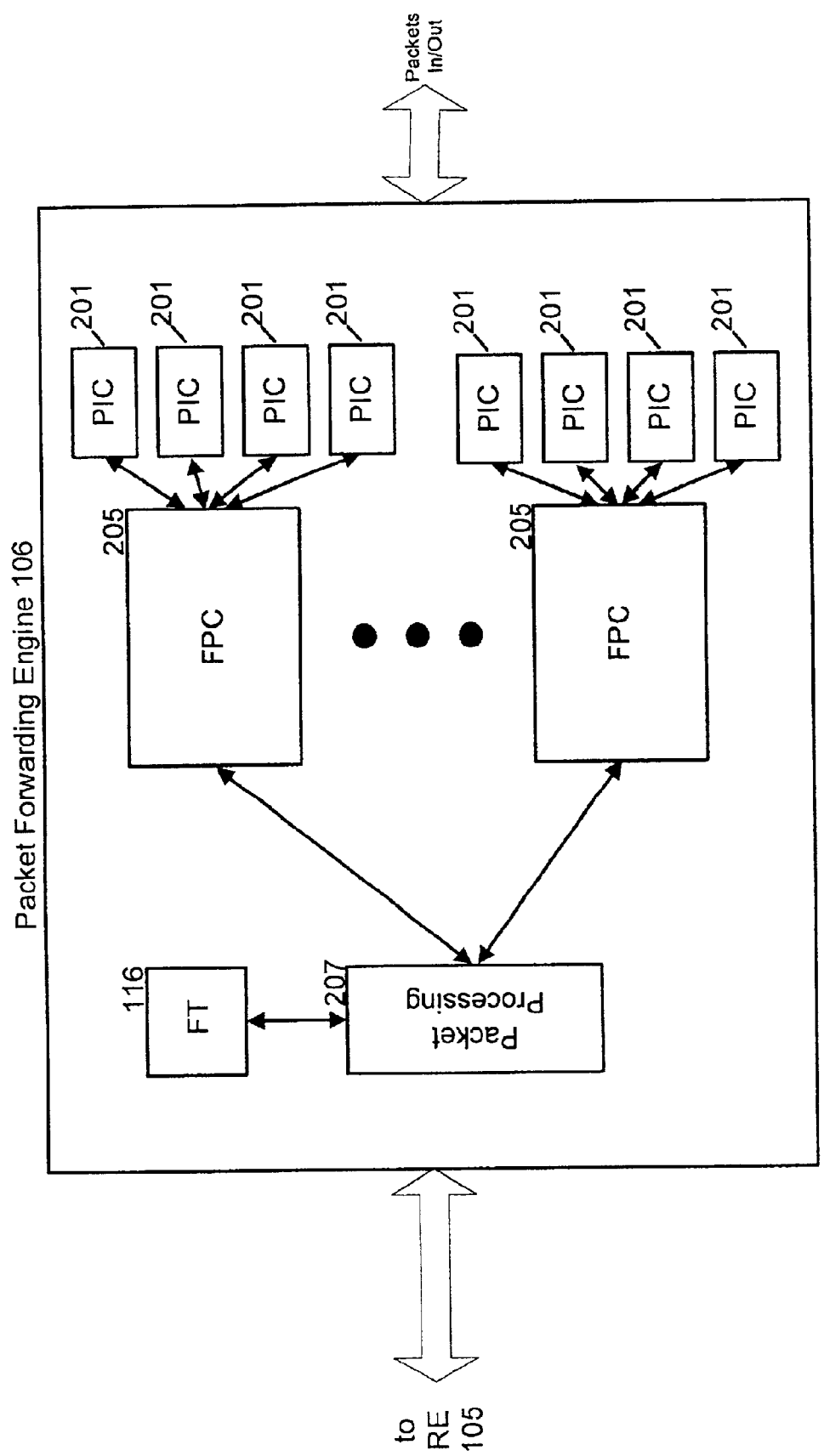
FIG. 2 is a diagram illustrating an implementation of a packet forwarding engine in the router shown in FIG. 1.

FIG. 2 is a diagram illustrating, in more detail, an implementation of PFE 106 consistent with an aspect of the present invention. PFE 106 generally handles input/output functions related to the incoming and outgoing packets. More particularly, PFE 106 receives the incoming packets through physical interface cards (PICs) 201, which forward the received packets to flexible PIC concentrators (FPCs) 205. Packet header information from the received packets is transmitted from FPCs 205 to packet processing component 207. In order to conserve bandwidth in transmitting the header information to packet processing component 207, FPCs 205 may strip the packet header information from the packet body. The body may be stored by FPC 205, with only the header being transmitted to packet processing component 207. The processed header, including its destination PIC, may subsequently be received by FPCs 205, which reassemble and transmit the packet through the appropriate PIC 201.

Incoming packets 110 and outgoing packets 111 may be received by different PICs 201 over a number of different types of physical transmission standards. For example, the packets may be received through a Gigabit Ethernet connection, an optical connection (e.g., OC-3 or OC-12) over ATM (asynchronous transfer mode), or an optical connection over SONET (synchronous optical network). Each different physical interface standard may be handled by a specially designed PIC 201. Packets received by the router 100 at one of PICs 201, after processing, may be transmitted from the router 100 by another one of PICs 201. In general, each of PICs 201 perform media-specific details, such as framing and checksum verification, for the packets received by the PIC 201. In this manner, router 100 can support packet routing over a network constructed using heterogeneous transmission components.

FPCs 205 provide a physical interface slot through which each hot-swappable PIC 201 is connected to router 100. In this manner, FPCs 205 connect packet processor 207 to PICs 201. FPCs 205 may perform other packet based functions, such as performing packet integrity checks and applying class-of-service rules to each packet.

Packet processor 207 performs the substantive operations relating to deciding the output port (i.e., the output PIC(s)) for each packet) for the incoming packets 110. Packet processor 207 consults forwarding table 116 to obtain this information. In the case of a multicast packet, there may be multiple outgoing interfaces.

As discussed, PICs 201 provide interfaces through which packets can be transmitted over different physical transmission standards. PICs 201 are hot-swappable, giving users the ability to dynamically connect different types of packet streams to PFE 106 through the appropriate PIC 201, without having to reboot or otherwise disrupt the operation of router 100.

Figure 3:
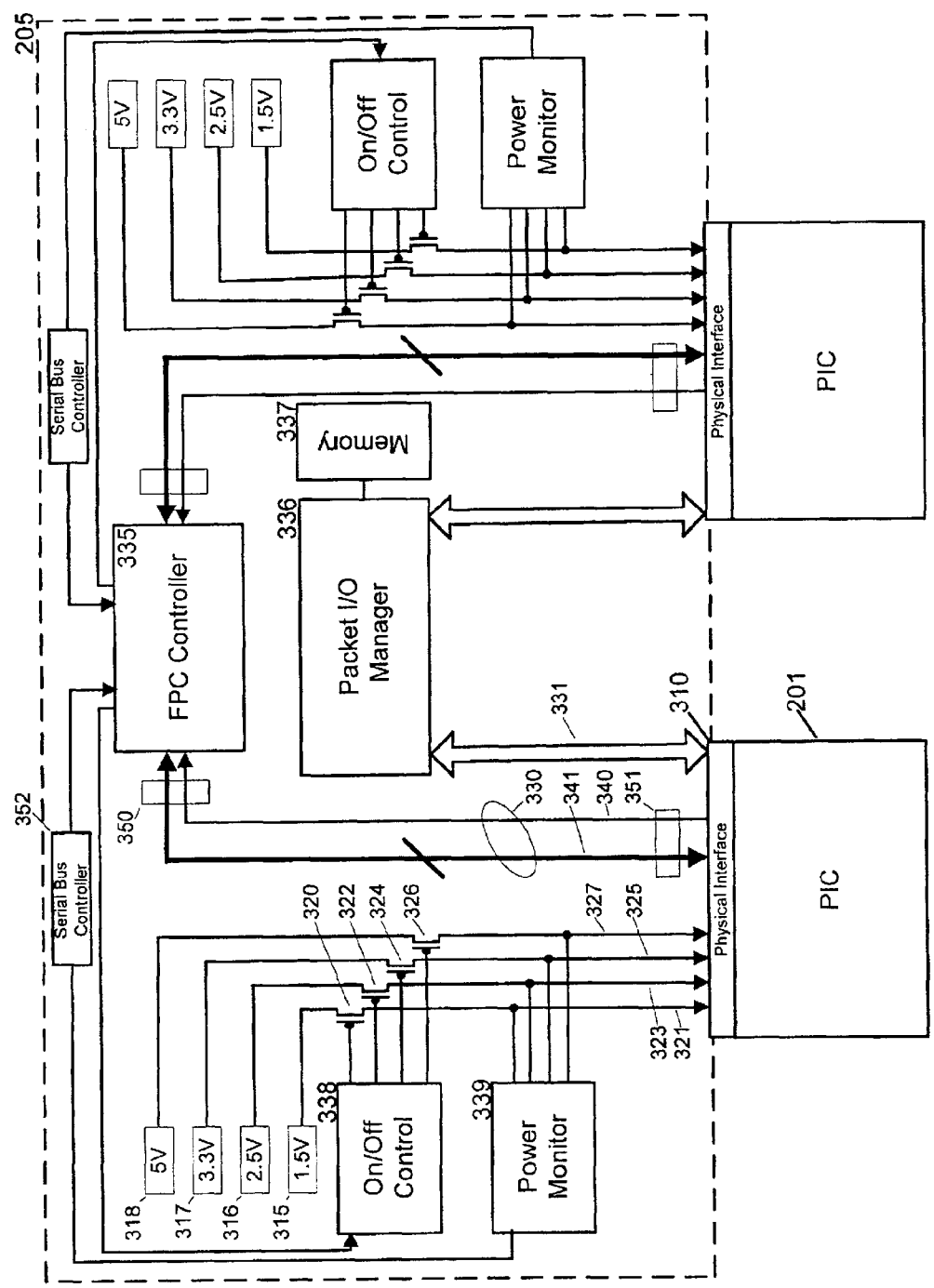
FIG. 3 is a block diagram illustrating portions of a flexible PIC controller in the packet forwarding engine shown in FIG. 2.

FIG. 3 is a block diagram illustrating portions of FPC 205 consistent with the present invention for implementing a hot-swappable PIC 201. For illustration, two PICs 201 are illustrated as being connected to FPC 205 in FIG. 3. In practice, each FPC 205 may support more than two PICs 201 (such as the four PICs illustrated in FIG. 2).

FPCs 205 may connect to hot-swappable PICs 201 through a physical interface 310. Through each physical interface 310, a number of different data and power signals are transmitted to the corresponding PIC 201. In particular, as shown, FPC 205 includes a 1.5 volt power source 315, a 2.5 volt power source 316, a 3.3 volt power source power source 317, and a 5 volt power source 318. The 1.5 volt source 315 may connect to PIC 201 through switch 320 and power line 321. Similarly, the 2.5 volt source 316 may connect to PIC 201 through switch 322 and power line 323; the 3.3 volt source 317 may connect to PIC 201 through switch 324 and power line 325; and the 5 volt source 318 may connect to PIC 201 through switch 326 and power line 327. Data buses 330 and 331 connect PIC 201 to FPC controller 335 and packet I/O manager 336, respectively. Data bus 331 may include a high speed data bus over which the packets received at PIC 201 are transmitted. Data bus 330 may include a pin detection line 340 and a control bus 341. Control bus 341 may be, for example, a parallel CPU bus. FPC 205 additionally includes for each PIC 201 connected to the FPC 205, circuitry for managing power supplied to the PIC, illustrated as on/off control circuit 338 and power monitor circuit 339. A serial bus controller 352, positioned between FPC 335 and on/off control circuit 338, may be used to facilitate communications between FPC controller 335 and on/off control circuit 338.

Packet I/O manager 336 receives packets from PICs 201 over high-speed data bus 331. Packet I/O manager 336 may transmit the packet header information to packet processing component 207 and store the packet body in memory 337. Memory 337, in addition to being used by packet I/O manager 336, may be shared with packet I/O managers on other FPCs 205. In this manner, the collection of memories 337 on all of the FPCs 205 can together function as one larger distributed memory.

As previously mentioned, FPC controller 335 generally manages the interfacing of PICs 201 to FPC 205. More particularly, status and control information relating to PIC 201 may be exchanged on control bus 341 and the insertion state of PIC 201 may be communicated using pin detection line 340. A more detailed description of the operation of the components shown in FIG. 3 for implementing hot-swappable PICs 201 will be further discussed with reference to FIGS. 4 through 6.

Figure 4:
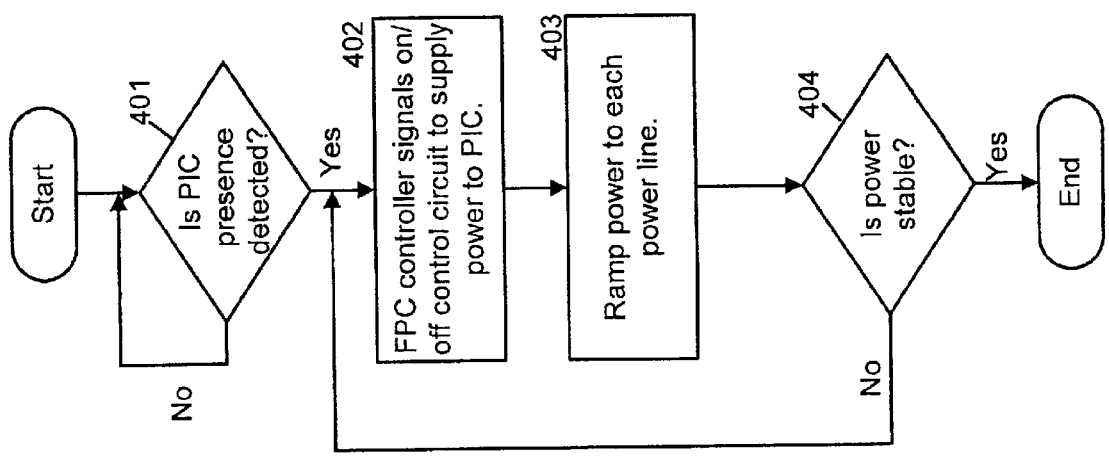
FIG. 4 is a flow chart illustrating methods consistent with the present invention for inserting a PIC into a flexible PIC controller.

FIG. 4 is a flow chart illustrating methods consistent with the present invention for inserting one of PICs 201 into an FPC 205.

FPC controller 335 begins a PIC insertion procedure when it detects the presence of a PIC 201 in physical interface 310. (Act 401). The presence of PIC 201 may be initially detected through an electrical connection with a predetermined pin in the PIC 201 connected to pin detection line 340. The pin may be a "short" pin that implements a "Last-Make First-Break" connection with physical interface 310. More specifically, the predetermined pin may be designed to be the last pin to come into contact with physical interface 310 when the PIC is inserted and the first pin to lose contact with physical interface 310 when the PIC is removed. Accordingly, when the presence of PIC 201 is detected on pin detection line 340, FPC controller 335 can be sure that the PIC 210 is fully inserted. A filter may be inserted between physical interface 310 and FPC controller 335 to eliminate signal bounce.

After detecting the presence of the newly inserted PIC 201, FPC controller 335 supplies power to the detected PIC 201. More particularly, the FPC controller signals the on/off control circuit to begin supplying power to the power lines 321, 323, 325, 327. (Act 402). On/off control circuit 338 subsequently ramps the power supplied to each power line. (Act 403). Monitor circuit 339 monitors the newly supplied power to ensure stability of the power supply. (Act 404). If the power has not stabilized after a predetermined time period, FPC controller 335 restarts the power-up procedure.

Figure 6:
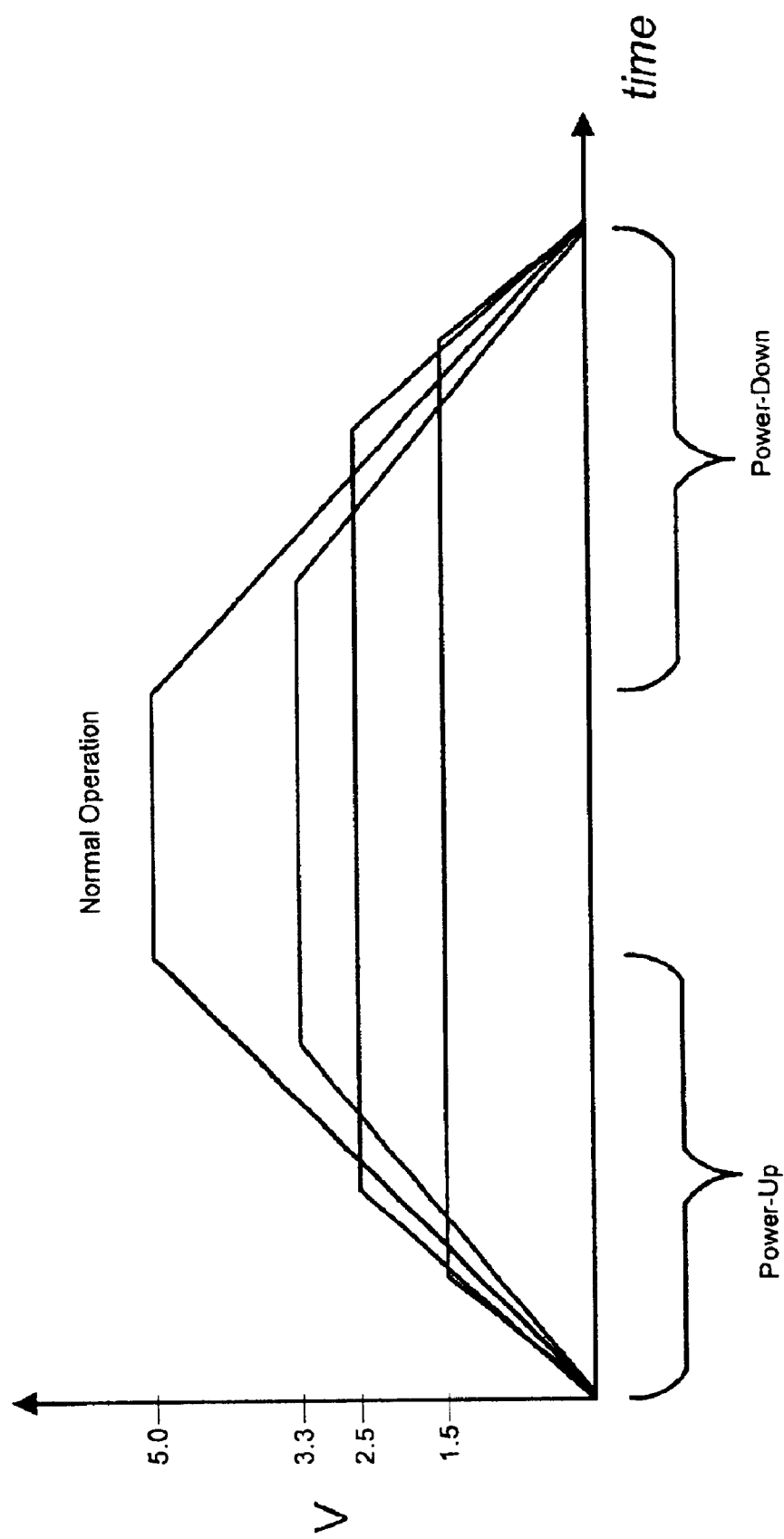
FIG. 6 is a diagram illustrating an exemplary graph of a ramped voltage.

On/off circuit 338, instead of abruptly turning the power on or off through its associated switches 320, 322, 324, and 326, may activate the power in a ramp fashion to thus produce a corresponding ramp in the applied or removed power. FIG. 6 is a diagram illustrating exemplary ramped voltages. As shown, the supplied voltage is steadily increased to the load PIC over time. A typical ramping time may be, in the range of, 5 milliseconds to 20 milliseconds. Similarly, on power-down, the supplied power may be ramped down. By ramping the supplied voltage, a more stable on/off procedure can be achieved.

Figure 5:
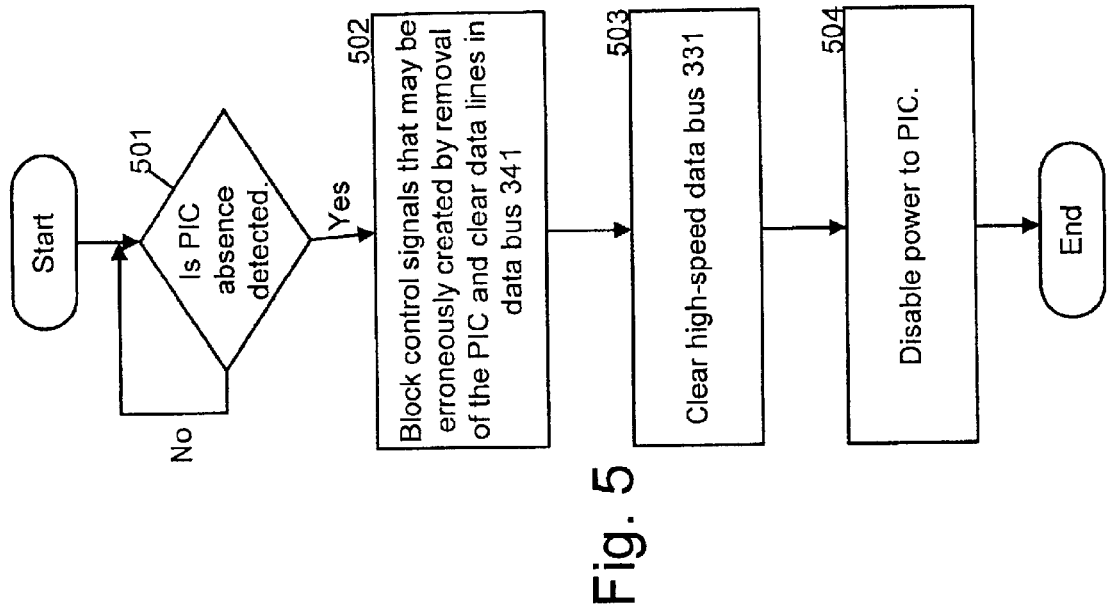
FIG. 5 is a flow chart illustrating methods consistent with the present invention for removing a PIC from a flexible PIC controller.

FIG. 5 is a flow chart illustrating methods consistent with the present invention for removing a PIC from an FPC.

The FPC controller 335 may begin by detecting the removal of the PIC 201. (Act 501). FPC 205 detects the removal of PIC 201 by the break of the electrical connection indicated on detection pin line 340. In addition, or in the alternative, FPC controller 335 can detect the removal of PIC 201 in software by detecting a time-out on control bus 341 after the PIC 201 fails to respond to bus requests for a predetermined period of time (e.g., 3 microseconds).

Dynamically removing one of PICs 201 can create spurious signals on control bus 341 and high-speed data bus 331. These signals can confuse or even damage packet I/O manager 336 and/or FPC controller 335. Accordingly, FPC controller 335, after detecting the removal of PIC 201, blocks the reception of any control signals from PIC 201 over control bus 341 and zeroes out data lines on bus 341. (Act 502). FPC controller 335 may additionally assert a signal to packet I/O manager 336 to clear the data lines on high-speed bus 331. (Act 503). Finally, the FPC controller 335 turns-off the power supplied through power lines 321, 323, 325, and 327. (Act 504). As with the power-up sequence, FPC controller 335 may power-down the supplied power through on/off control circuit 338 by ramping down each power supply (as shown in FIG. 6).

Acts 501–504, as performed by FPC controller 335, allow PICs 201 to be removed from router 100 while minimizing the chance of experiencing errors or electrical disruption of data or control signals on FPCs 205. Further, by sequentially ramping-up and ramping-down the power supplied to PICs 201, undesirable power surges caused by capacitive coupling can be reduced.

Buffers, such as buffers 350 and 351, may be inserted between PICs 201 and the FPC controller 335 and/or packet I/O manager 336 to further reduce the occurrence of spurious signals.

Although FPC controller 335 is shown as a single controller for FPC 205, in an alternate embodiment, FPC controller 335 may be implemented as independent controllers for each PIC 201. For example, for each PIC 201, controller 335 may include a separate CPU used to control the PIC 201. This can be desirable to insure that each PIC 201 operates independently of the other PICs and that an error in one PIC does affect other PICs.

As described above, hot-swappable physical interface cards allow a router to communicate using a variety of network technologies. The physical interface cards are not required to include any internal power supplies and can be freely exchanged with each other.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

Although described as being primarily implemented in hardware, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

The scope of the invention is defined by the claims and their equivalents.

What is claimed is:

1. A device including slots for a plurality of hot-swappable physical interface cards, the device comprising:

an interface designed to receive the physical interface cards, each physical interface card designed to receive information using at least one of a plurality of physical network interface standards;

a plurality of power supply lines for supplying power from the device to the physical interface card through the interface;

an on/off power control circuit connected to the plurality of power supply lines to control power supplied to the power supply lines;

a power monitor circuit connected to each of the plurality of power supply lines, the power monitor circuit determining when the power supplied to each of the power supply lines stabilizes: and a controller connected to the on/off power control circuit, the controller, in response to detecting the presence of the physical interface card in the interface, instructing the on/off power control circuit to turn on the plurality of power supply lines and to ramp the power supplied to each one of the turned on power supply lines, the controller additionally causing the device to restart a power-up procedure implemented by the on/off power control circuit and the power monitor circuit when the power monitor circuit determines that the power supplied to one of the power supply lines has not stabilized after a pre-determined time period.

2. The device of claim 1, wherein the controller detects the presence of the physical interface card in the interface by detecting an electrical connection with a predetermined pin in the physical interface card.

3. The device of claim 1, further comprising:
a packet I/O manager connected to the physical interface card through a high-speed bus, the packet manager receiving packets of information from the physical interface cards over the high-speed bus.

4. The device of claim 1, further comprising:
a plurality of switches controlled by the on/off power control circuit; and
a plurality of power supplies, one of the plurality of power supplies being connected to each of the power supply lines through a corresponding one of the plurality of switches.

5. The device of claim 1, wherein the physical interface cards are designed to receive information over at least one of an Ethernet connection, an optical connection over ATM, and an optical connection over SONET.

6. The device of claim 1, wherein the device is a router.

7. The device of claim 2, wherein the predetermined pin in the physical interface card is designed to be the last pin to come into contact with the interface.

8. The device of claim 4, wherein the plurality of power supplies supply at least one of 1.5 volt, 2.5 volt, 3.3 volt, or 5 volt power.

9. The device of claim 3, further comprising:
a memory connected to the packet I/O manager for storing the packets received by the packet I/O manager.

10. The device of claim 1, wherein the power supplied to each one of the turned on power supply lines is ramped over a time period between about 5 to 20 milliseconds.

11. A method of responding to the insertion of an interface card into a device during run-time operation of the device, the method comprising:
detecting an electrical connection of the interface card to the device;
turning on each of a plurality of power lines in the device that lead to the interface card, each of the plurality of power lines being turned on by ramping a power supply to a predetermined maximum voltage value over a predetermined time period, where larger predetermined maximum voltage values are ramped over a longer predetermined time period;
monitoring the turned-on power lines for stability; and
restarting the turning on each of the plurality of power lines when the monitoring detects that one of the turned-on power supply lines has not stabilized after a second predetermined time period.

12. The method of claim 11, wherein the electrical connection of the interface card to the device is detected by detecting an electrical connection with a predetermined pin in the interface card.

13. The method of claim 11, further including receiving packets of information from the interface cards over a high-speed bus connected to the device.

14. The method of claim 11, wherein the interface cards are designed to receive information over at least one of an Ethernet connection, an optical connection over ATM, or an optical connection over SONET.

15. The method of claim 11, wherein the predetermined time period is between about 5 milliseconds to 20 milliseconds.

16. The method of claim 12, wherein the predetermined pin in the interface card is designed to be the last pin to come into contact with the device.

17. A method of responding to the removal of an interface card from a physical interface of a device during run-time operation of the device, the method comprising:

detecting, at a controller in the device, a physical removal of the interface card from the physical interface of the device;
clearing a data bus connected between the controller and the physical interface;
blocking signals caused by removal of the interface card on control lines between the physical interface and the controller; and
turning off each of a plurality of power lines in the device that lead to the interface card, each of the plurality of power lines being turned off by ramping down the power supply over a predetermined time period.

18. The method of claim 17, wherein the removal of the electrical connection of the interface card to the device is detected by detecting an absence of an electrical connection at a predetermined pin in the interface card.

19. The method of claim 17, wherein the predetermined time period is between about 5 milliseconds to 20 milliseconds.

20. The method of claim 18, wherein the predetermined pin in the interface card is designed to be the first pin to break contact with the device.

21. The method of claim 18, wherein the interface cards are designed to receive information over at least one of an Ethernet connection, an optical connection over ATM (asynchronous transfer mode), or an optical connection over SONET.

22. A hot-swappable physical interface card designed to be inserted into a network device comprising:
a first interface to one of a plurality of types of network connections; and
a second interface configured to connect the physical interface card to the device, the interface including connections for receiving:
a plurality of power supply lines through which power is received from the device, the device activating the plurality of power supply lines by ramping the power supplied to each one of the power supply lines in response to the device detecting insertion of the physical interface card and the device restarting supplying of power through the power supply lines when the device detects that the power supplied to one of the power supply lines has not stabilized after a pre-determined time period;
a control bus; and
a high-speed data bus for communicating packets of information with the device.

23. The physical interface card of claim 22, the control bus including connections for receiving:
control lines connected to a controller on the device, the control lines including a pin detection line, the device detecting the presence of the physical interface card by detecting an electrical connection through the pin detection line.

24. The physical interface card of claim 22, wherein the power is ramped to the plurality of power supply lines over a time period between about 5 to 20 milliseconds.

25. The physical interface card of claim 22, wherein the pin detection line is the last line in the physical interface card to come into contact with the device.

26. The physical interface card of claim 22, wherein the physical interface card is designed to receive information over at least one of an Ethernet connection, an optical connection over ATM, or an optical connection over SONET.

27. The physical interface card of claim 22, wherein the power supply lines supply at least one of 1.5 volt, 2.5 volt, 3.3 volt, or 5 volt power to the physical interface card.

28. The physical interface card of claim 22, wherein the pin detection line is the first line in the interface to break contact with the device when the physical interface card is removed from the router.

29. The physical interface card of claim 22, wherein the device is a network router.

* * * * *